US 6,671,053 B1

(12) United States Patent
Euteneuer et al.

(10) Patent No.: US 6,671,053 B1
(45) Date of Patent: Dec. 30, 2003

(54) ILLUMINATION MEASURING DEVICE

(75) Inventors: Arno Euteneuer, Marburg (DE); Harald Giessen, Marnheim (DE); Martin Hofmann, Weimar-Niederweimar (DE)

(73) Assignee: Transmit Gesellschaft fur Technologietransfer mbH, Giessen (DE)

( * ) Notice: Subject to any disclaimer, the term of this patent is extended or adjusted under 35 U.S.C. 154(b) by 0 days.

(21) Appl. No.: 10/009,589

(22) PCT Filed: Jun. 6, 2000

(86) PCT No.: PCT/EP00/05177

§ 371 (c)(1),
(2), (4) Date: Dec. 11, 2001

(87) PCT Pub. No.: WO00/77482

PCT Pub. Date: Dec. 21, 2000

(30) Foreign Application Priority Data

Jun. 13, 1999 (DE) .......................... 199 26 812

(51) Int. Cl.⁷ .................. G01B 9/02; G02B 27/46
(52) U.S. Cl. ................ 356/450; 356/519; 359/561
(58) Field of Search ................ 356/450, 519; 359/561

(56) References Cited

U.S. PATENT DOCUMENTS

| 4,406,542 A | * | 9/1983 | Boggy et al. |
| 4,628,473 A |   | 12/1986 | Weaver |
| 4,792,230 A | * | 12/1988 | Naganuma et al. |
| 5,033,853 A | * | 7/1991 | Frangineas |
| 5,107,351 A | * | 4/1992 | Leib et al. |
| 5,530,544 A | * | 6/1996 | Trebino et al. |

FOREIGN PATENT DOCUMENTS

| DE | 2247709 | 9/1972 |
| WO | WO 90/02099 | 3/1990 |

* cited by examiner

Primary Examiner—Stephen C. Buczinski
(74) Attorney, Agent, or Firm—Clark & Brody

(57) ABSTRACT

In a method for influencing and measuring pulsed electromagnetic illumination, e.g. parallel laser light (L), said illumination or light can be spatially divided, in particular, in an autocorrelator comprising a beam receptor (12), can be recombined behind said beam receptor by a superposition or focusing device (18 or 58) and can be detected in the recombinant area by a detector (20). As the transmission system (52), the beam receptor comprises beam profile dividers in a penetrable housing (50), in the form of at least two transmission parts (54; 56), with or in which separate, preferably parallel component beams (S, T) can be modified in their time-based beam characteristics, before being recombined. The inventive beam receptor (12) preferably has at least a two-part mirror (22), plate (32), chamber or crystal system (42) comprising a beam profile divider (14, 24, 34, 44) which creates or leaves unchanged a base component beam (S), whilst the time-based characteristics of this or every other component beam (T) in a neighbouring beam profile divider (16, 26, 36, 46) can be controlled in a different manner, in order to effect, in particular, reflection or transmission delays and/or changes to the optical paths.

16 Claims, 4 Drawing Sheets

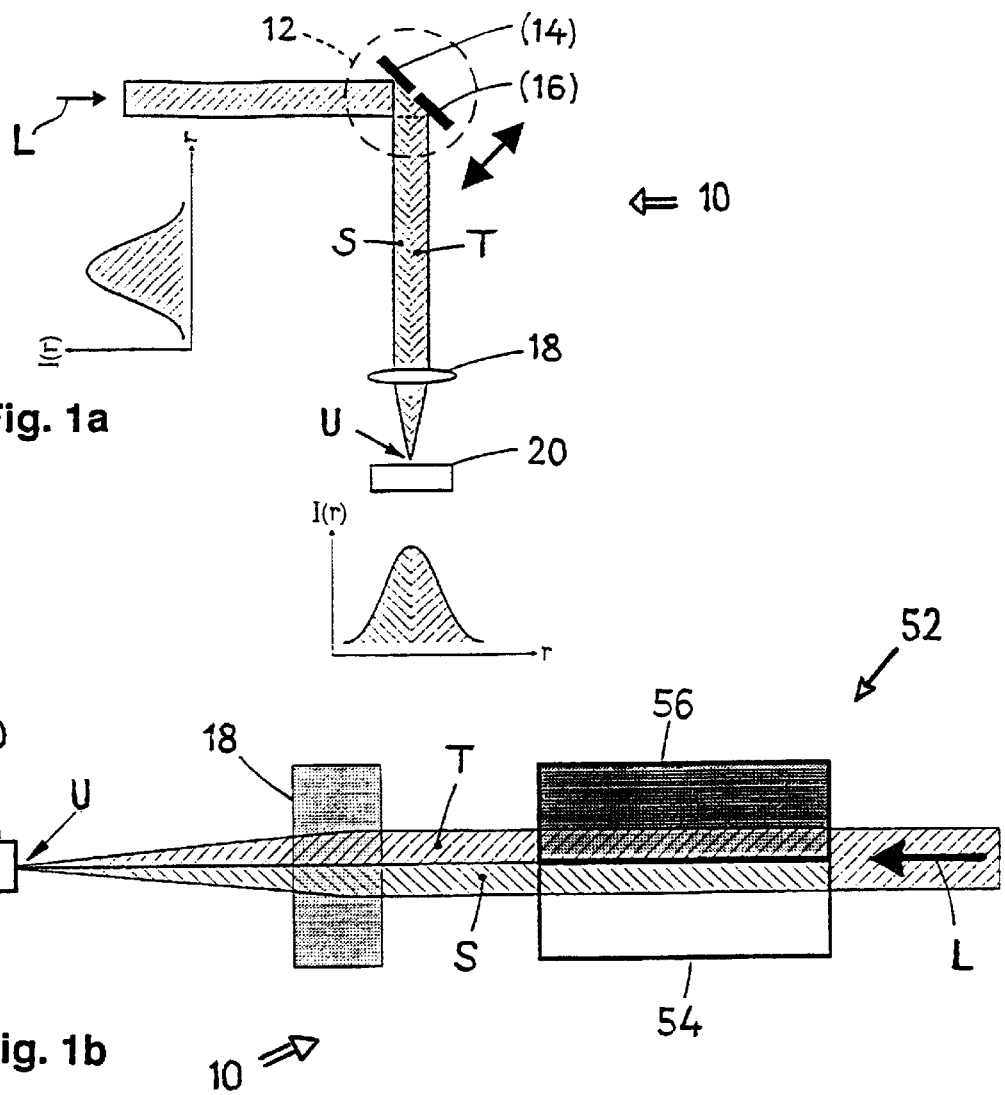
Fig. 1a
Fig. 1b
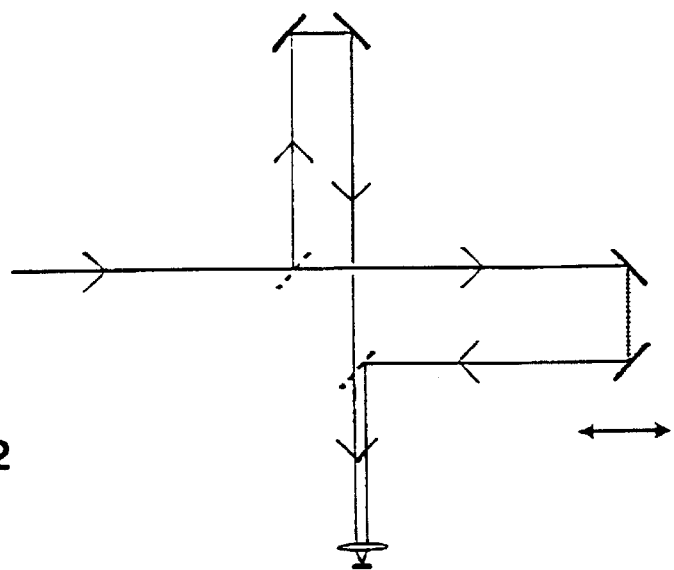
Fig. 2

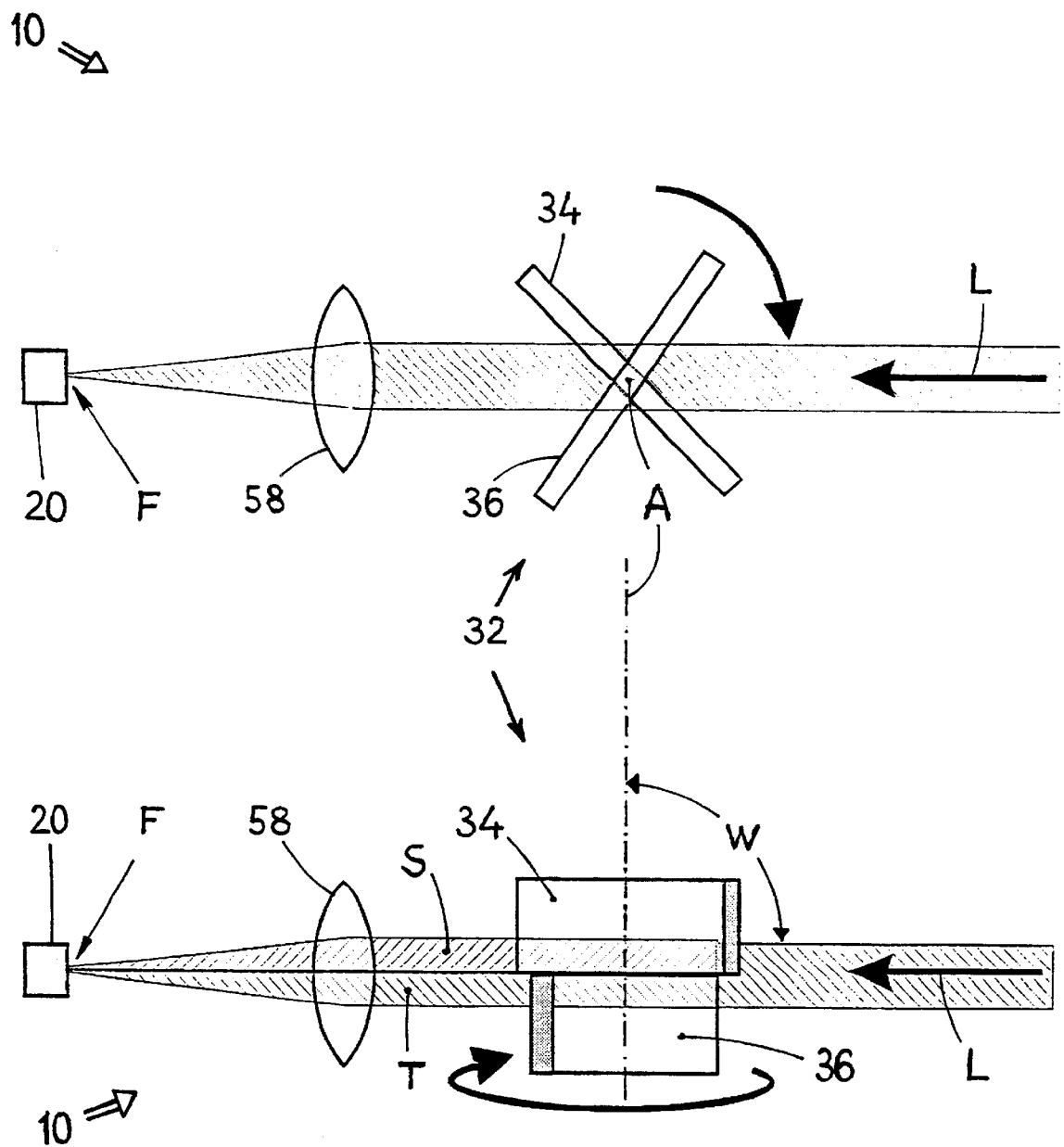

ILLUMINATION MEASURING DEVICE

FIELD OF THE INVENTION

The invention relates to a system controlling and measuring pulsed electromagnetic radiation, in particular to an auto-correlator.

Optical path lengths are deliberately altered in autocorrelators following beam splitting, for instance being controlled to periodically fluctuate, in order to measure pulse widths and pulse shapes using split beams. The technical background is especially significant in laser applications, foremost those using narrow light pulses less than 1 ns or 100 ps wide, which require knowledge of the pulse shape in the time domain. This pulse shape is ascertained by measuring the pulse autocorrelation function.

BACKGROUND ART

Typically a light beam is split into two parts through semi-transparent mirrors in interferometer-like manner in an autocorrelator, said two parts being time offset and then being combined in a non-linear, optical crystal, the optical summed frequency of the two split beam signals being formed in a detector. An illustrative design is disclosed in U.S. Pat. No. 4,628,473. The autocorrelation function of the delays in the individual beam delays is obtained by measuring the time-integral of the added-frequency signal, of which the intensity depends on the overlap in the time domain of the mutually time-shifted and/or space-shifted light pulse parts. In the design of the U.S. Pat. No. 4,406,542 for instance, a rotating glass block is used to implement different delays in the two beam paths.

In general beam splitting is carried out in a Michelson interferometer comprising two semi-transparent mirrors and a geometric/mechanical element which time-shifts the generated split beams relative to each other. FIG. 2 shows the functional diagram as it is known from textbooks. Because the split beams first must be guided along separate paths and then are recombined, both costly precision mechanics and thin-film optics will be required. Adjustment entails substantial labor and moreover is hampered by the mandatory phase matching of the non-linear optical crystal. In palliation, the non-linearity function may be assumed by two-photon absorption in a photodetector and the time-integral of the photo-current may be taken as a function of the delays of the particular split beams, for instance in the manner described in "*Autocorrelation measurement of 6-fs pulses based on the two-photon-induced photocurrent in a GaAsP photodiode*" by J. K. Ranka et al in Optics Letters 22 (1997) #17, pp 1344–46.

SUMMARY OF THE INVENTION

The objective of the invention is to lower the costs of measuring the pulse shape, namely of auto-correlation and cross-correlation, and to lower the complexity of adjustments. Foremost it creates an auto-correlator of technically simple design which is manufactured in especially economical manner and which can be directly integrated for instance into ultra-narrow pulse laser systems.

The invention is based on a design to control and measure pulsed electromagnetic radiation, in particular collimated laser light, said light being split in beam receiver and then being recombined by a superposition or focusing element such as a lens and being picked up by a detector in the recombination zone. The beam receiver is at least in two parts; illustratively it consists of mutually adjacent beam profile splitters allowing altering the time-domain beam features of the split and preferably mutually parallel beams before they are recombined.

All time shifts and/or phase shifts are construed within the scope of the present invention being those entailing different delays in reflection or transmission, phase changes and/or changes in optical path lengths. The concept of spatial beam profile denotes the intensity distribution transversely to the direction of beam propagation, namely a function $I(x,y)$, where x,y are the transverse coordinates, or $I(r)$, where r is a coordinate running radially to the beam. Accordingly a beam profile splitter denotes a device changing the spatial beam profile of the incident light into split beams each with its own beam profile. The invention does not relate to conventional beam splitting without a change in profile, for instance in a partly transmitting mirror.

The manufacture of an autocorrelator of the invention only entails a fraction, for instance one tenth, of the price of conventional systems. The easily monitored and dimensionally stable design requires remarkably few accessories.

The beam profile splitters are independently controllable and as a result already a change by one of the beam profile splitters attains a change in the beam characteristics in the time domain.

The beam receiver is a system of mirror(s), plate(s), chamber(s) or crystal(s) comprising one beam profile splitter producing a reference split beam or leaving it unchanged, where at least one further beam profile splitter near the first one allows controlling the time characteristic(s) of the particular or any other split beam(s).

In another embodiment, the beam receiver is a mirror with a split specular surface of which the split mirror elements are mutually displaceable. A determinant advantage of the split mirror element design over conventional auto-correlators is the absence of any dispersion since no dispersive elements are needed. Preferably at least one split mirror element is displaceable in the direction of the specular normals relative to an illustratively stationary split mirror element or to a movable, phase-shifted split mirror element. In yet another embodiment, at least one of the beam profile splitters may be connected to an oscillator, for instance a loudspeaker, piezo oscillator or the like that is mounted to its back.

An alternative design is in the form of transmission elements acting as beam profile splitters and being rotatable relative to each other and/or about an axis subtending an axis with the incident beam, whereby optical path lengths and phase shifts may be implemented. In another design, two or more transmission elements are thin and flat, their (optical) thickness being made to match the pulse shape to be measured. Said elements may consist of glass, quartz, plastic or the like, they may also assume to form of strips or plates, and be mounted tightly near each other. These partly stationary and partly displaceable planar elements may be configured on edge or transversely in very simple, elegant and economical manner. At least one of the beam profile splitters may be driven by a motor and/or into vibration.

In another embodiment of the invention, the beam receiver for instance may be a cubic of parallelipipedic crystal comprising a segment which either is fitted with a terminal or lacks one and a further segment that is fitted with contact surfaces and in a state which can be changed by an electrical, a magnetic or an electromagnetic field in order that, illustratively, a phase shift be implemented by a change in the index of refraction. This design eliminates displaceable elements or modules; accordingly the autocorrelator shall be especially sturdy and easily handled.

The present invention moreover relates to an apparatus of the kind cited above wherein in particular collimated laser light shall be split in a beam receiver for the purpose of controlling and measuring pulsed electromagnetic radiation, said laser light being recombined beyond said beam receiver by means of a superposition or focusing device, for instance a lens, and shall be detected in the recombination zone by a detector, and where, the beam receiver comprises a transparent housing which, in the form of a beam profile splitter encloses at least two transmission elements wherein, before beam recombination, changes in the time-domain radiation characteristics in the separate and preferably parallel split beams can be implemented, namely different delays in reflection or transmission, phase changes and/or changes in optic path lengths. This apparatus is characterized by not requiring moving parts.

The invention offers the advantage that at least two transmission elements designed as beam splitters may be controlled independently of one another and that as a result a plurality of control modes is feasible.

In another aspect of the invention, one transmission element may generate a reference split beam or leave it unchanged and be mounted parallel to at least one further transmission element that may control the time-domain characteristic of the other split beam(s). Claim 14 specifically provides that the other split beam(s) can be phase shifted by the further transmission element, preferably so as to be 180° out of phase with the first split beam, so that specular or interference effects can be produced in simple manner.

Moreover the invention relates to apparatus to control and measure electromagnetic radiation by combining geometric beam splitting and ultra-narrow pulses of less than 1 ns, preferably less than 100 ps, in such a way that at their output sides split beams running along at least two optic paths of different lengths or phase changes are detected before reaching or when reaching a recombination zone by means of a detector or other measuring device. This feature allows new applications, illustratively pulse idiosyncracies using a non-linear crystal or a two photon absorption detector (TPA), moreover the generation and measurement of pulse patterns, distance or chirp measurements, phase measurements or phase distortions, characterizing and analyzing materials, polarization adjustments etc.

In that respect, the invention provides that a test object can be inserted between the beam receiver and at least one beam profile splitter or between at least one beam profile splitter or the recombination device, in order that, for instance, identification or composition of a material can be displayed and/or measured.

A further alternative of the invention is that an object to be tested shall constitute one of the beam profile splitters and/or that two or more objects to be tested shall each constitute one of the beam profile splitters.

Further features, details and advantages of the present invention are stated in the claims and in the following description of illustrative embodiments in relation to the drawing.

BRIEF DESCRIPTION OF THE DRAWINGS

FIG. 1a is a schematic of a new autocorrelator,

FIG. 1b schematically shows another new autocorrelator,

FIG. 2 schematically shows a conventional autocorrelator in the form of an interferometer, FIG. 4b is a sideview of the system of FIG. 4a, FIG. 5a is a topview of a crystal system, and FIG. 5b is a sideview of the system of FIG. 5a.

DETAILED DESCRIPTION

Figure 3A:
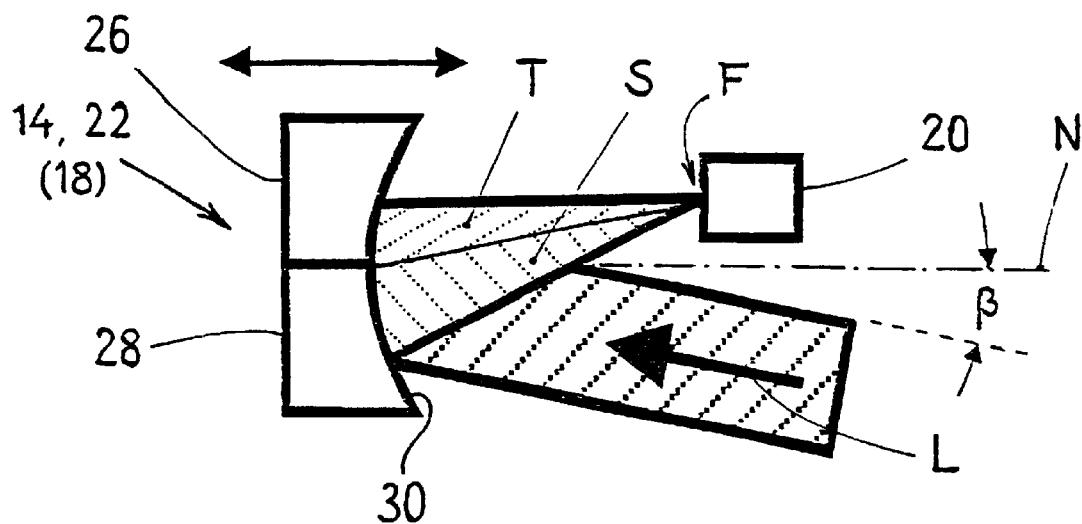
FIG. 3a is topview of a mirror system.

The schematic of FIG. 1a shows apparatus which is denoted overall by 10 and comprising a beam receiver 12. This beam receiver 12 in turn comprises at least two mutually displaceable beam profile splitters 14, 16, for instance parallel mirror elements whereby the incident, pulsed light L is split into two split beams S, T which shall be recombined in a recombination device 18. A detector 20, for instance a two-photon detector, may be present in the superposition zone U or near it. The intensity profile I(r) is schematically indicated by similar shadings next to the beams L or S, T.

FIG. 1b shows that a device which in this instance is a modulator 52 may be used as the beam receiver for the incident light L. This sensor uses as the beam profile splitter for instance an axial transmission element 54 for a reference split beam S and a further, adjacent transmission element 56 allowing to control the time-domain characteristic of another split beam T, whereupon the split beams are recombined in the superposition zone U.

Figure 3B:
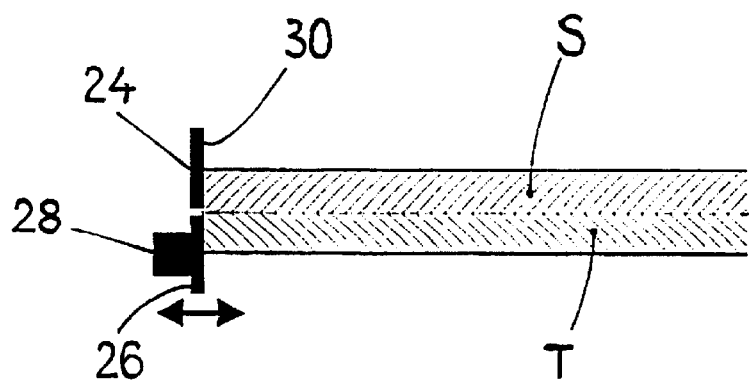
FIG. 3b is a sideview of the system of FIG. 3a, FIG. 4a is a topview of a wafer system.

FIGS. 3a and 3b show a concrete illustrative embodiment of the generalized apparatus of FIG. 1a. This beam receiver 12 comprises a concave mirror system 22 having beam profile splitters in the form of a split mirror element 24 which is either displaceable or not and runs parallel to a displaceable mirror element 26 that in turn is connected at its back side to be connected to, and driven by a loudspeaker 28 or by another vibrating means. The light L to be analyzed is distributed in approximately equal amounts over the mirror elements 24, 26; said light is incident at a small or moderate angle $\beta$ relative to the normal of the mirror surface 30. The reflected split beams S, T are focused by the mirror system 22 simultaneously acting as a focusing device at a focus F. An illustrative two-photon absorption detector 20 is situated at said focus or near it (U, FIG. 1). In operation and on account of the relative motions of the mirror elements 24, 26, the spatially separate split beams S, T will be delayed one with respect to the other. No dispersive elements at all are needed for such an auto-correlator.

As regards the apparatus 10 shown in FIGS. 4a and 4b, the beam profile splitting of the incident laser light L is implemented by transmission elements 32. In the embodiment shown, the beam profile splitters are in the form of a stationary transmission element 34 and a rotatable transmission element 36. Both segments may assume the geometries of strips or plates and consist for instance of glass, quartz or plastic. If the rotatable part 36 illustratively is motor driven, then such displacement will vary the optical path length in the split beam T—depending on the instantaneous transmission depth—relative to the unaltered reference split beam S. Again detector recording to attain the correlation function is implemented by recombination at the focus F using a focusing element 58.

Figure 5A:
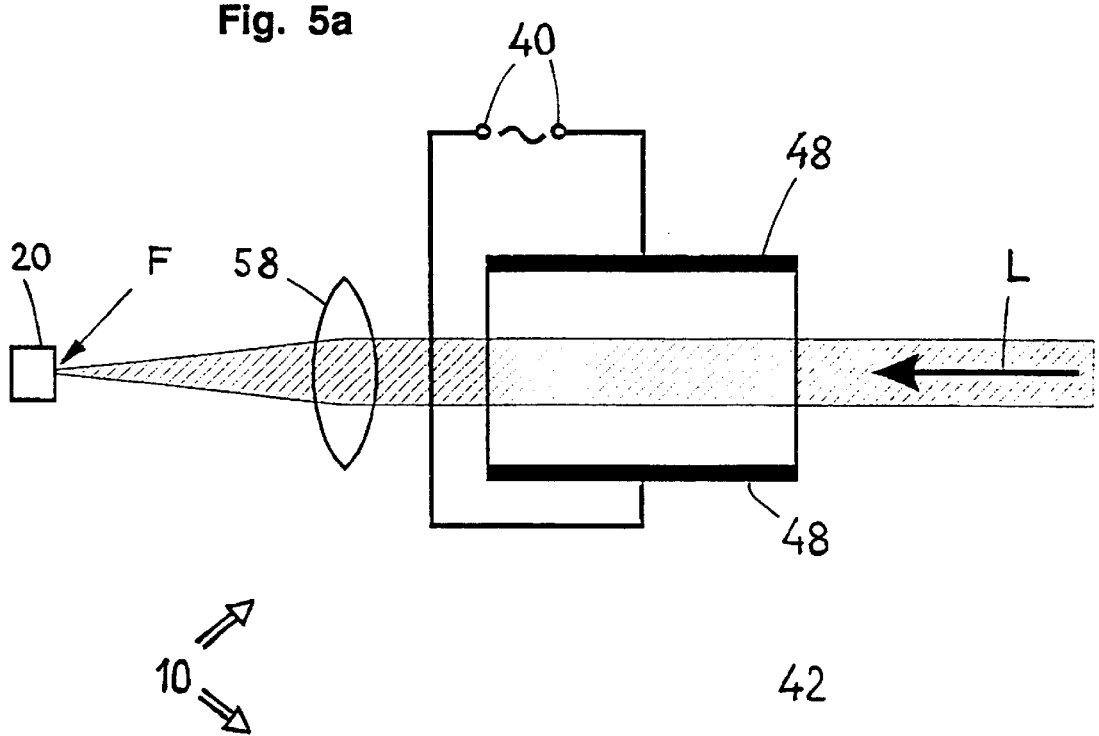
Figure 5B:
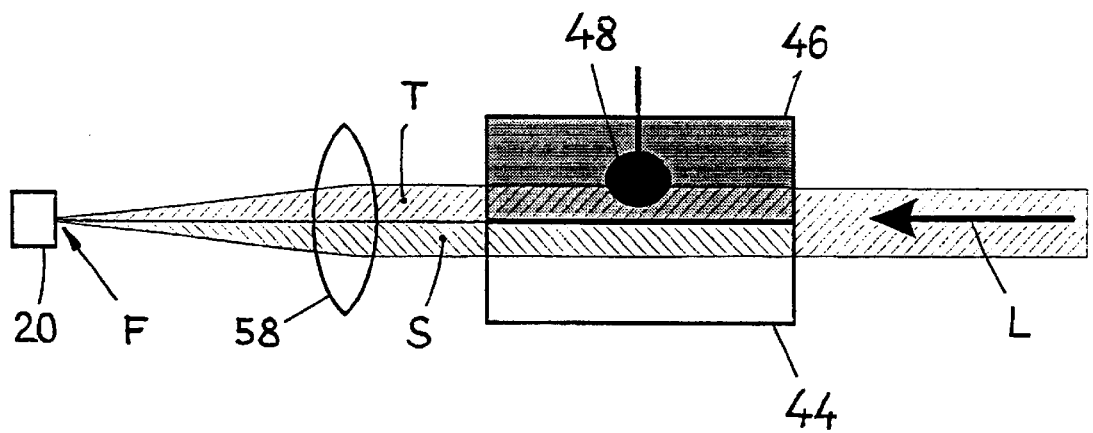

In another embodiment shown in FIGS. 5a and b, the design principle is substantially that of FIG. 1b, and no moving mechanical parts are needed. In this embodiment the laser light L passes through a crystal system 42 acting as a beam profile splitter and containing a splitter segment 44 which may which may or may not be fitted with an electrical terminal, and next to it and in contact with it is situated a splitter segment 46 of which the electrical contact areas 48 are fitted with electrical leads 40 running to a power source indicated in merely symbolic manner. It is clear from this drawing that the terminal-fitted splitter segment 46 acting as an electro-optical crystal will affect the split beam T which shall be recombined with the unaltered reference split beam S at the focus F by the focusing element 58. The mutually delayed beam portions are picked up at the detector 20 which is configured in the recombination zone of the split beams S, T.

The invention is not restricted to embodiment modes such as those described above, rather it may be altered in many ways. As regards controlling and measuring pulsed electro-magnetic radiation, for instance collimated laser light L, such radiation, i.e. light can be split in particular in an autocorrelator fitted with a beam receiver 12 or a modulator 52 and be recombined beyond by a superposition element 18 or 58—for instance a lens—and be picked up in the recombination zone by a detector 20. The beam receiver in the form of the transmission system 52 comprises within a transparent housing 20, at least two transmission elements 54, 56 wherein separate and preferably parallel split beams S, T can be controlled with respect to the time-domain radiation characteristics before they will be recombined. Preferably the beam receiver 12 of the invention comprises at least one dual system of mirrors (22), plates (32) or chamber or crystals (42) fitted with a beam profile splitter 14, 24, 34, 44 creating a reference split beam S or leaving it unaltered, whereas, in at least one adjacent beam profile splitter 16, 26, 36,46, the time-domain characteristic of the other split beam(s) T can be controlled in a different way, in particular in order to attain delays in reflection or transmission, phase shifts and/or changes in optical path lengths.

All features and advantages found in the claims, the specification and the drawings, including design details, spatial configurations and procedural steps, are within the scope of the invention whether singly or in arbitrary combinations.

| PARTS LIST | |
|---|---|
| A | axis |
| β | angle |
| F | focus |
| L | laser light |
| N | normal (to 22) |
| S | reference split beam |
| T | further split beam |
| U | superposition zone |
| W | angle |
| 10 | autocorrelator |
| 12 | beam receiver |
| 14 | stationary or displaceable element |
| 16 | displaceable element |
| 18 | recombination device |
| 20 | detector |
| 22 | mirror system |
| 24 | split mirror element |
| 26 | further split mirror element |
| 28 | vibrator/loudspeaker |
| 30 | specular surface |
| 32 | transmission elements/plates |
| 34 | transmission element |
| 36 | rotatable transmission element |
| 40 | terminals (voltage source) |
| 42 | crystal system |
| 44 | beam splitting segment free of terminal(s) |

-continued

| PARTS LIST | |
|---|---|
| 46 | beam splitting segment fitted with terminal(s) |
| 48 | contact areas |
| 50 | housing |
| 52 | beam receiver (modulator) |
| 54 | transmission element |
| 56 | further transmission element |
| 58 | focusing element |

What is claimed is:

1. An apparatus for controlling and measuring pulsed electromagnetic radiation, in particular an auto-correlator, comprising;

a beam receiver (12) splitting incident electromagnetic radiation, preferably collimated laser light (L) into two split beams (S, T), a superposition or focusing device (18 resp. 58), preferably a lens, situated behind the beam receiver (12) and recombining the split beams (S, T), and a detector (20) situated in a recombination zone of the split beams (S, T) and detecting the split beams, wherein the beam receiver (12) comprises at least two beam profile splitter elements (14, 16; 24, 26; 34, 36; 44, 46; 54, 56) which are configured next to each other, and wherein the incident electromagnetic radiation, after contacting surfaces of the at least two beam profile splitter elements, has its cross section spatially split to produce two split beams of lesser spatial cross section, and means for altering the time domain of one of the split beams of lesser cross section (S,T) exiting from one surface of one of the at least two beam profile splitter elements (14, 16; 24, 26; 34, 36; 44, 46; 54, 56) as compared to the other of the exiting split beams by either mutually displacing one of the at least two beam profile splitter elements with respect to another of the at least two beam profile splitter elements or by altering a state of one of the at least two beam profile splitter elements with respect to another of the at least two beam profile splitter elements.

2. Apparatus as claimed in claim 1, characterized in that the beam receiver (12) and altering means are in the form of a system of mirror(s) (22), plate(s) (32), chamber(s) or crystal(s) (42) and includes at least one beam profile splitter (14, 24, 34, 44, 54) generating a reference split beam (S) or leaving it unchanged, whereas the time-domain characteristic of the other split beam(s) (T) shall be controlled as desired.

3. Apparatus as claimed in claim 1, characterized in that the beam receiver (12) and altering means are a mirror of split specular surface (30) of which the split mirror elements (24; 26) are mutually displaceable, preferably in the direction of the normal N to the specular surface.

4. Apparatus as claimed in claim 1, characterized in that the beam receiver (12) and altering means include the at least one beam profile splitter (26) being connected to a vibrator (28) for instance to a loudspeaker, a piezoelectric vibrator mounted at its back.

5. Apparatus as claimed in claim 1, characterized in that the beam receiver (12) and altering means comprise transmission elements (32) which are mutually rotatable and/or about an axis (A) subtending an angle (W) with the incident beam (L) in order to implement changes in optical path lengths or in time delays.

6. Apparatus as claimed in claim 5, characterized in that two or more transmission elements (34, 36) are planar elements (34, 36) of which the optical or material thickness is matched to the pulse shape to be measured.

7. Apparatus as claimed in claim 5, characterized in that the transmission elements (34, 36) consist of glass, quartz, or plastic and are in the form of strips or plates and are configured tightly next to each other, on edge or transversely.

8. Apparatus as claimed in claims 5, characterized in that at least one of the beam profile splitters (36) is driven by a motor and/or by a vibrator.

9. Apparatus as claimed in claim 1, characterized in that the beam receiver (12) and altering means comprise a cubic or a parallelipipedic crystal system (42) comprising one beam splitting element (44) that is fitted or not with an electrical terminal and at least one further beam splitting element (46) which is fitted with contact areas (48) and the state of which can be altered by an electrical or magnetic or electromagnetic field.

10. Apparatus as claimed in claim 1 characterized in that the beam receiver (12, 52) and altering means comprises a transparent housing (50) which in its form of beam profile splitters encloses at least two transmission elements (54; 58) which implement changes in the time-domain beam characteristics in the separate split beams (S, T) before these are recombined, one transmission element (54) which generates a reference split beam (S) or leaves it unaltered being configured parallel to at least one further transmission element (56) that controls as desired the time-domain characteristic(s) of the one or every other split beam (T).

11. Apparatus as claimed in claim 10, characterized in that the one, or every other, split beam (T) can be controlled in phase-shifted manner and preferably so as to be 180° out of phase relative to a first split beam (S) by means of the further transmission element (56).

12. Apparatus as claimed in claim 1, characterized by combining geometric beam profile splitting and ultra-narrow pulses less than 1 ns, preferably less than 100 ps duration, in such a way that, at the output side, split beams (S, T) exhibiting at least two different lengths of optical paths or phase shifts can be sensed ahead of or within a recombination zone using a measurement device, preferably a detector (20).

13. Apparatus as claimed in claim 12, characterized in that an object to be tested can be inserted between a beam receiver (12, 52) and at least one beam profile splitter (14, 16; 24, 26; 34, 36; 44, 46; 54, 56) or between at least one beam profile splitter (14, 16; 24, 26; 34, 36; 44, 46; 54, 56) and the recombination zone.

14. Apparatus as claimed in claim 12, characterized in that an object to be tested constitutes one of the beam profile splitters (14, 16; 24, 26; 34, 36; 44, 46; 54, 56) and/or that two or more objects to be tested each constitute one of the beam profile splitters (14, 16; 24, 26; 34, 36; 44, 46; 54, 56).

15. Apparatus as claimed in claim 1, wherein the split beams are mutually parallel when exiting the beam profile splitter.

16. Apparatus as claimed in claim 10, wherein the split beams are mutually parallel when exiting the beam profile splitter.

* * * * *

UNITED STATES PATENT AND TRADEMARK OFFICE
CERTIFICATE OF CORRECTION

PATENT NO.    : 6,671,053 B1
DATED         : December 30, 2003
INVENTOR(S)   : Arno Euteneuer et al.

It is certified that error appears in the above-identified patent and that said Letters Patent is hereby corrected as shown below:

Title page,
Item [75], Inventors, please delete "Marburg (DE)" and replace it with -- Germering (DE) --.

Signed and Sealed this

Twenty-second Day of November, 2005

JON W. DUDAS
*Director of the United States Patent and Trademark Office*